Figure 1:
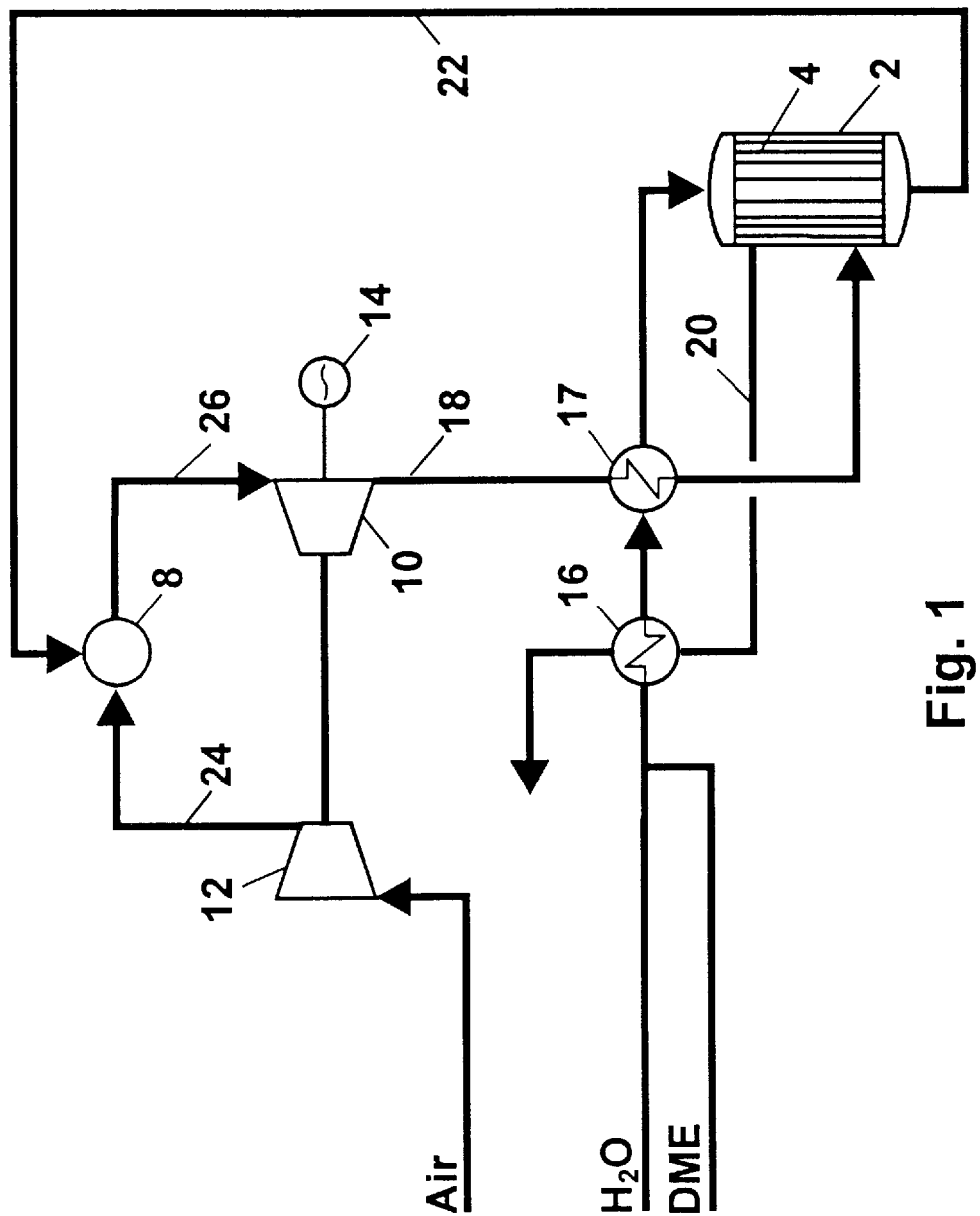

United States Patent [19]
Topsøe

[11] Patent Number: 5,819,522
[45] Date of Patent: Oct. 13, 1998

[54] PROCESS FOR GENERATING POWER IN A GAS TURBINE CYCLE

[75] Inventor: Haldor Frederik Axel Topsøe, Vedbæk, Denmark

[73] Assignee: Haldor Topsoe A/S, Lyngby, Denmark

[21] Appl. No.: 695,978

[22] Filed: Aug. 16, 1996

[30] Foreign Application Priority Data

Aug. 23, 1995 [DK] Denmark .................................. 0946/95

[51] Int. Cl.⁶ ...................................................... F02E 3/28
[52] U.S. Cl. ........................................ 60/39.02; 60/39.12
[58] Field of Search ................. 60/39.02, 39.05, 60/39.12, 39.511

[56] References Cited

U.S. PATENT DOCUMENTS 4,567,857   2/1986   Houseman et al. ..................... 123/3
5,394,685   3/1995   Kesten et al. ........................ 60/39.02

FOREIGN PATENT DOCUMENTS 0351094   1/1990   European Pat. Off. .
0723068   7/1996   European Pat. Off. .

*Primary Examiner*—Louis J. Casaregola
*Attorney, Agent, or Firm*—Ostrolenk, Faber, Gerb & Soffen, LLP

[57] ABSTRACT

Process for generating power in a gas turbine cycle comprising an air compression stage, a fuel gas combustion stage and an expansion stage providing mechanical power in a rotating power generator, the improvement of which comprises recovering heat contained in exhaust gas from the expansion step by means of endothermic catalytic conversion of primary fuel comprising dimethylether and/or methanol with water to a gas comprising hydrogen and carbon monoxide and employing at least a part of the hydrogen and/or carbon monoxide comprising gas as fuel gas in the fuel gas combustion stage.

2 Claims, 1 Drawing Sheet

PROCESS FOR GENERATING POWER IN A GAS TURBINE CYCLE

The present invention relates to a process for the generation of electrical power. In particular, the invention concerns improved power generation in chemically recuperative gas turbine cycles.

The use of gas turbines has been significantly increased in recent decades. Particularly for power generation, combination of air compressors, high pressure burners and gas turbines have been of growing importance. Those units are most often used to supply energy in form of mechanical or electric power, and heat in form of steam whether for chemical applications or for heating purpose.

Typical fuel used in gas turbines comprises natural gas or other gaseous fuel usually petroleum fractions, which are produced by gasification of primary fossil fuel or by vaporizing liquid fuels.

Recent developments have focused on improving the overall efficiency which has i.a. caused increase of pressure at which burners are operating, modification in burner design and increase in temperature at inlet to the gas turbine. Realizing the thermodynamic gains in operating a gas turbine at the highest possible temperatures, the reheat process has been introduced where expansion takes place in two stages and where the gas is reheated by adding part of the fuel between the stages.

The original version of gas turbine based power plants was a one-cycle process where all air was burned with all fuel and expanded in one step. Through improvements over the years, this process has now in its most modern version reached overall energy efficiency between 35% and 40% calculated as the content of energy in electricity related to the lower heating value of all fuel used. The efficiency is considerably below what is achieved in most steam boiler/steam turbine based plants operating on any fossil fuel.

The low efficiency is mainly a consequence of the high energy content in exhaust gas, which leaves the turbine at high temperatures in the range of 400°–800° C. Attempts have, therefore, been made to recover energy at present as latent heat in the exhaust gas. Several processes were recently introduced based on use of excess heat by preheating or by conversion into high pressure steam for use in a separate power cycle, or for power and heat generation in a conventional steam turbine. The combined gas and steam cycle has improved the overall energy efficiency to 45–50%.

Further progress including the introduction of re-heating for combined cycle plants has made it possible to obtain overall energy efficiency close to 60%. This result is obtained by installation of quite complex equipment operating close to the borderline of what is technically obtainable today.

It has further been considered to recover the heat content in exhaust gas from a gas turbine by introducing an endothermic chemical process. It has thus been proposed to supply the heat necessary for endothermic conversion of hydrocarbons, e.g. natural gas or distillates, and steam to partially convert hydrocarbons into combustible gases, containing hydrogen and carbon monoxide, and then use the gas resulting from the steam reforming process as fuel in burners upstream the gas turbine.

Use of chemical recuperation is difficult for many reasons. As a main drawback of chemical recuperation it is not possible to utilize heat below a certain temperature in the range of 500° C. or the process can only be used if steam reforming equipment is combined with a separation process for hydrogen as described in Danish Patent Application No. 0070/95.

The main object of this invention is to provide a cheap and efficient process for recovering the heat content in exhaust from gas turbines by use of dimethylether (DME) and/or methanol as primary fuel.

Accordingly, this invention is a process for generating power in a gas turbine cycle comprising an air compression stage, a fuel gas combustion stage and an expansion stage providing mechanical power in a rotating power generator, the improvement of which comprises recovering heat contained in exhaust gas from the expansion step by means of endothermic catalytic conversion of primary fuel comprising dimethylether and/or methanol with water to a gas comprising hydrogen and/or carbon monoxide and employing at least a part of the hydrogen and carbon monoxide comprising gas as fuel gas in the combustion stage.

DME may be prepared directly from natural gas or from other fossil fuels as described in e.g. U.S. Pat. No. 4,417,000 and DE Pat. No. 4,222,655.

The invention makes use of DME or methanol feed capacity to absorb heat down to temperatures as low as 200°–225° C. through conversion of the feed with water vapor to a gas containing hydrogen, CO, and methane as main combustible components. The conversion reactions are carried out in presence of one or more catalysts, which are arranged in a reactor and heated by the hot exhaust gas from the gas turbine in the expansion step.

The conversion of DME and methanol (MeOH) into gas turbine fuel is performed by the chemical reaction described below:

$$CH_3OCH_3 + H_2O \leftrightarrows 2CH_3OH \tag{1}$$

$$CH_3OH + H_2O \leftrightarrows CO_2 + 3H_2 \tag{2}$$

$$CO_2 + H_2 \leftrightarrows CO + H_2O \tag{3}$$

Catalysts, which are able to catalyze the above reactions at low temperatures, are acidic zeolites, alumina silicate, silica alumina and alumina physically admixed with a conventional methanol decomposition catalyst based on Cu—Zn-alumina, as described in Danish Patent Application No. 0852/95.

The process is attractive because i.a. of the low temperature at which DME or MeOH can absorb heat and convert it into chemical energy which will be released ahead of the gas turbine. An overall energy balance is achieved by using a simple once-through gas turbine giving exhaust temperatures in the range 500°–800° C. and high overall energy efficiency is obtained without reheat, thus simplifying the plant. DME/MeOH and water process feed can through preheat and vaporization utilize the remaining heat in the exhaust gas leaving the DME/MeOH converter e.g. at 250° C. and thus advantageously convert heat in the exhaust gas down to a very low flue gas temperature even below 100° C.

The ratio between water and DME and/or MeOH may vary within wide limits, and thus be determined exclusively on the basis of optimum and overall energy efficiency. optimum efficiency will typically require a low ratio between steam and DME/MeOH in the range 2:1 to 20:1. The reactor may be of the conventional type, including tubular reactors with the exhaust gas flowing around tubes and the process gas through the tubes filled with catalysts.

Preferably, two or more types of catalyst will be applied. A low temperature catalyst, which will retain high activity down to temperature about 200° C. as described hereinbefore and high temperature catalyst e.g. alumina, which may be exposed to higher temperature than tolerated by the low temperature catalyst. The high temperature catalyst will preferably be used for completing the conversion of DME and/or MeOH.

Introduction of DME and/or MeOH into the process is carried out together with water. The mixture may be preheated and vaporized, thus taking advantage of the fact that the steam-DME/MeOH vapor mixture can be fully vaporized at the high pressure required at temperatures considerably lower than otherwise required when steam is vaporized separately.

The invention will be described more detailed in the following Example by reference to the drawing, in which FIG. 1 shows a simplified process scheme for DME based single cycle, single heat turbo power plant.

EXAMPLE

Operating under the conditions shown in FIG. 1, it is possible to obtain an overall energy efficiency of 48%, which is at least some 20% higher than what is otherwise obtained in a conventional single cycle plant.

The plant comprises a reforming reactor 2 with catalyst tubes 4 containing a catalyst mixture of ZSM-5 and a Cu—Zn-alumina methanol decomposition catalyst commercially available from Haldor Topsoe A/S, Denmark.

A combustion chamber 8 is connected to reactor 2. Combustion chamber 8 supplies hot gas to a gas turbine 10 by burning hydrogen and carbon monoxide containing fuel gas obtained by DME reforming in reactor 2. The fuel is burned with compressed air from air compressor 12 being shaft connected to gas turbine 10. Gas turbine 10 is, furthermore, shaft connected to a rotating power generator 14 for the production of electrical energy.

In operating the above gas turbine cycle 94101 Nm$^3$/h feed gas of H$_2$O and DME with a mole ratio of H$_2$O:DME 14.5:1 are preheated in preheater 16 to a temperature of 196° C. by indirect heat exchange with turbine exhaust gas 20 having been cooled in reactor 2 to a temperature of 308° C. as further described below. The preheated feed is further heated to 300° C. in preheater 17 by indirect heat exchange with hot turbine exhaust gas 18 leaving turbine 10 at a temperature of 771° C. and being cooled to a temperature of 450° C.

The preheated gas is then introduced at 300° C. into reforming reactor 4. In reactor 4, the gas is reformed by contact with the above catalyst mixture to hydrogen rich fuel gas 22 having a composition of 30.52 mole % hydrogen, 59.22 mole % water, 10.01 mole % carbon dioxide, and 0.25 mole % carbon monoxide. The endothermic reforming reaction proceeding in tube 4 of the reactor is maintained by heat supplied from exhaust gas 18 being introduced at a temperature of 450° C. on shell side of tubes 4 in reactor 2. Having supplied heat to the reforming reactions the exhaust gas is withdrawn from reactor 2 as cooled exhaust gas 20 at a temperature of 309° C. and used for preheating the feed gas to reactor 2 as described above.

Fuel gas 22 is conducted at a reactor outlet temperature of 350° C. and a flow rate of 118385 Nm$^3$/h to combustion chamber 8 and combusted with air 24 being supplied from compressor 12 at a pressure of 16 atm, a temperature of 420° C. and a flow rate of 137921 Nm$^3$/h. Combusted gas 26 from combustion chamber 8 is introduced at a temperature of 1350° C., a pressure of 16 atm and a flow rate of 238,094 Nm$^3$/h into gas turbine 10. The gas is expanded to atmospheric pressure thereby providing rotating energy, which is converted into electrical energy in generator 14.

At the above conditions, the energy content in the feed gas was 100 MW, which was converted to 48 MW electrical power in the gas turbine cycle corresponding to a cycle efficiency of 48%.

I claim:

1. In a process for generating power in a gas turbine cycle comprising an air compression stage, a fuel gas combustion stage and an expansion stage, providing mechanical power in a rotating power generator, the improvement which comprises:

recovering heat contained in exhaust gas from the expansion stage by means of endothermic catalytic conversion of primary fuel consisting of dimethyl ether with water to a gas containing hydrogen and/or carbon monoxide by contact with a catalyst composition of a dimethyl ether decomposition catalyst of acidic zeolites, aluminum silicates, silica alumina and alumina and a methanol decomposition catalyst, and employing at least a part of the hydrogen and/or carbon monoxide containing gas as fuel in the fuel gas combustion stage.

2. The process of claim 1, wherein the primary fuel being preheated by heat exchange with the exhaust gas prior to the catalytic conversion.

* * * * *